(12) United States Patent
Condon

(10) Patent No.: US 7,520,474 B1
(45) Date of Patent: Apr. 21, 2009

(54) CANTILEVERED PIPE SUPPORT BRACKET

(75) Inventor: Duane R. Condon, Ramona, CA (US)

(73) Assignee: Sioux Chief Mfg. Co., Inc., Peculiar, MO (US)

( * ) Notice: Subject to any disclaimer, the term of this patent is extended or adjusted under 35 U.S.C. 154(b) by 221 days.

(21) Appl. No.: 11/414,477

(22) Filed: Apr. 28, 2006

(51) Int. Cl.
F16L 5/00 (2006.01)

(52) U.S. Cl. .......................... 248/56; 248/58; 248/68.1; 248/300

(58) Field of Classification Search ............... 248/65, 248/58, 300, 218.4, 63, 56; 52/357, 359, 52/363
See application file for complete search history.

(56) References Cited

U.S. PATENT DOCUMENTS

| | | | | |
|---|---|---|---|---|
| 1,109,962 | A | * | 9/1914 | Chadwick ................. 248/56 |
| 3,041,033 | A | | 6/1962 | Schwartz |
| 3,285,552 | A | * | 11/1966 | Becker ................. 248/68.1 |
| 3,730,464 | A | | 5/1973 | Kelly |
| 3,730,472 | A | | 5/1973 | Dale |
| 4,267,994 | A | | 5/1981 | Lynch et al. |
| 4,550,451 | A | | 11/1985 | Hubbard |
| 5,149,026 | A | | 9/1992 | Allen |
| 5,263,676 | A | * | 11/1993 | Medlin et al. ............ 248/300 |
| 5,303,887 | A | | 4/1994 | Hasty, deceased et al. |
| D358,755 | S | * | 5/1995 | Davis ................... D8/354 |
| 5,587,555 | A | | 12/1996 | Rinderer |
| 5,615,850 | A | * | 4/1997 | Cloninger ............... 248/68.1 |
| 5,876,000 | A | | 3/1999 | Ismert |
| 6,126,122 | A | | 10/2000 | Ismert |
| 6,158,066 | A | | 12/2000 | Brown et al. |
| 6,375,128 | B1 | | 4/2002 | Condon et al. |
| 6,427,952 | B2 | | 8/2002 | Caveney et al. |
| 6,595,476 | B1 | * | 7/2003 | Edwards ................. 248/200.1 |
| 6,702,236 | B1 | | 3/2004 | Kirschner |
| 6,796,335 | B1 | | 9/2004 | Hubbard et al. |
| 6,935,079 | B1 | * | 8/2005 | Julian et al. ............ 52/357 |
| 2001/0030267 | A1 | | 10/2001 | Caveney et al. |
| 2002/0104942 | A1 | * | 8/2002 | Mimlitch et al. ......... 248/300 |
| 2005/0006534 | A1 | | 1/2005 | Shillings |
| 2006/0169850 | A1 | * | 8/2006 | Wunderlich et al. ...... 248/68.1 |

OTHER PUBLICATIONS

Advertising materials of Sioux Chief Mfg. Co., Inc. showing Copper Plated Stub Out Bracket; exact date of publication unknown, but believed to have been published more than one year prior to the filing date of the present application.

* cited by examiner

Primary Examiner—Amy J. Sterling
(74) Attorney, Agent, or Firm—Erickson, Kernell, Derusseau & Kleypas, LLC

(57) ABSTRACT

A cantilevered pipe support bracket for supporting a pipe in spaced relation to a building member includes a front plate and a pair of side plates. The front plate includes a primary mounting tab and an arm extending outwardly therefrom. The arm has a plurality of pipe receiving openings formed therethrough and spaced therealong. Each of the pipe receiving opening is sized to receive a respective pipe. The side plates are connected to opposed edges of the arm and extend rearwardly therefrom at an obtuse included angle. Each side plate has a base end having a secondary mounting tab formed thereon.

25 Claims, 3 Drawing Sheets

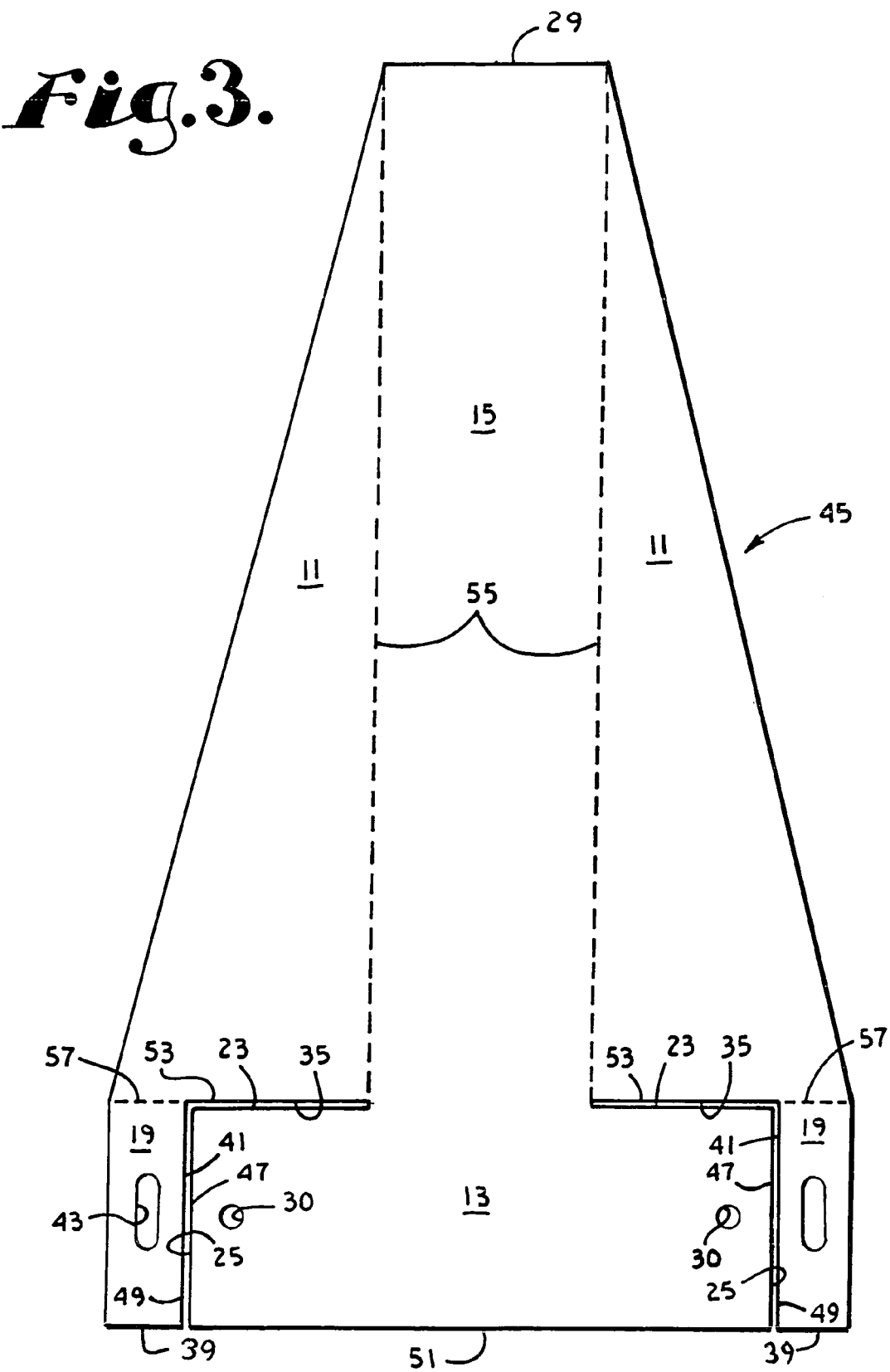

CANTILEVERED PIPE SUPPORT BRACKET

BACKGROUND OF THE INVENTION

1. Field of the Invention

This invention relates to the field of plumbing hardware, and in particular to a cantilevered bracket for supporting plumbing pipes in spaced relation to a building member.

2. Description of the Related Art

Plumbing support brackets of the type used to locate and support plumbing pipes in a bay between building members are well known in the art. These brackets are especially useful in locating stub-outs for faucets, showerheads, and the like between wall studs. U.S. Pat. No. 4,550,451 to Hubbard discloses a simple bracket having pipe receiving openings spaced along its entire length. The bracket is attachable to the outer edges of adjacent studs by inserting fasteners such as nails or screws through fastener openings located intermediate the pipe receiving openings.

Cantilevered brackets for supporting one or more pipes in spaced relation to a building member are also known. For example, U.S. Pat. Nos. 5,303,887 and 5,876,000 disclose molded plastic pipe support brackets, either of which may be used as a cantilever to support pipes in spaced relation to a building member or to another pipe. These brackets are sold by Sioux Chief Mfg. Co., Inc. of Peculiar, Mo. under the trademarks Pipe Titan™ and Grid Iron™.

Sioux Chief Mfg. Co., Inc. also sells a Copper Plated Stub out Bracket which is formed of 16 gauge copper plated steel. This is a relatively flat heavy bracket having a mounting tab and an A-shaped pipe support arm which extends outwardly therefrom. The pipe support arm includes a plurality of pipe receiving openings having annular flanges therearound to allow plumbing pipes to be soldered to the bracket.

SUMMARY OF THE INVENTION

The present invention is a cantilevered pipe support bracket for supporting a pipe in spaced relation to a building member includes a front plate and a pair of side plates. The front plate includes a primary mounting tab and an arm extending outwardly therefrom. The front plate is preferably T-shaped such that the primary mounting tab is wider than the arm and extends outwardly from the arm in opposed directions. The arm has a plurality of pipe receiving openings formed therethrough and spaced therealong. The pipe receiving openings may be sized to receive a standard size copper pipe and be encircled by an annular flange to facilitate soldering of the pipe to the bracket. Alternatively, the pipe receiving openings may be sized to receive a plastic insulator which, in turn, receives the pipe.

The side plates are connected to opposed edges of the arm and extend rearwardly therefrom at an obtuse included angle. Each side plate has a base end having a secondary mounting tab formed thereon. The side plates cross brace and reinforce the arm, providing a rigid installation and allowing the bracket to be formed of relatively thin material. The side plates may include notches sized and positioned to receive pipes running parallel to the front plate.

BRIEF DESCRIPTION OF THE DRAWINGS

FIG. 3 is a plan view of a blank from which the bracket of FIG. 1 is formed.

DETAILED DESCRIPTION OF THE PREFERRED EMBODIMENTS

Figure 1:
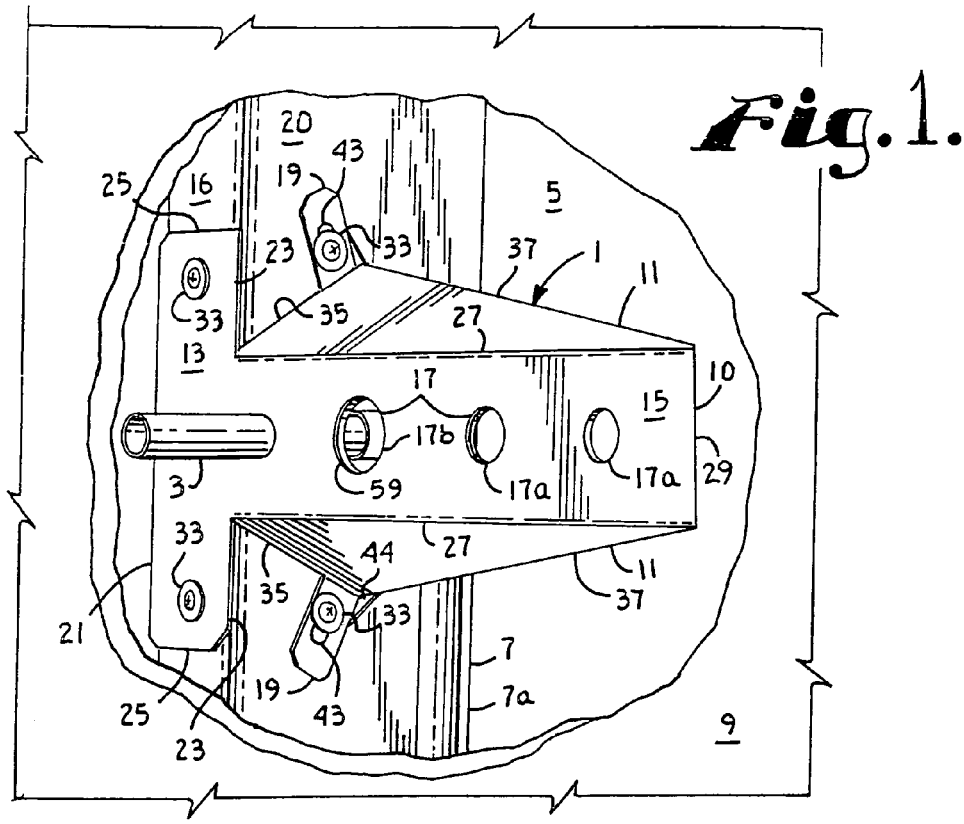
FIG. 1 is a perspective view showing a cantilevered pipe support bracket according to the present invention mounted to a wall stud inside a wall and supporting a pipe with a portion of the wallboard broken away for clarity.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Certain terminology will be used in the following description for convenience in reference only and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to the drawings in more detail, the reference number 1 generally designates a cantilevered plumbing support bracket according to the present invention. The bracket 1 is used for supporting plumbing pipes 3 in a bay 5 between building members 7, such as wall studs 7a. The wall studs 7a are covered by wallboard 9 fastened to the studs 7a, which may be, for example, gypsum board, wood paneling, exterior siding, or the like.

The bracket 1 is preferably formed of sheet metal, such as steel, and generally includes a front plate 10 and a pair of rearwardly extending side plates 11. The front plate 10 includes a primary mounting tab 13 and an arm 15 which extends outwardly from the mounting tab 13. The primary mounting tab 13 is sized and shaped to allow fastening to a narrow dimension or edge 16 of a building member 7. The arm 15 has one or more pipe receiving openings 17 formed therethrough. Each of the side plates 11 includes an outwardly extending secondary mounting tab 19 for fastening the bracket 1 to a face 20 or wide dimension of the building member 7. Because the side plates 11 act to brace and reinforce the front plate 10, the bracket 1 may be formed of relatively thin metal such as 26 to 24 gauge steel.

Figure 2:
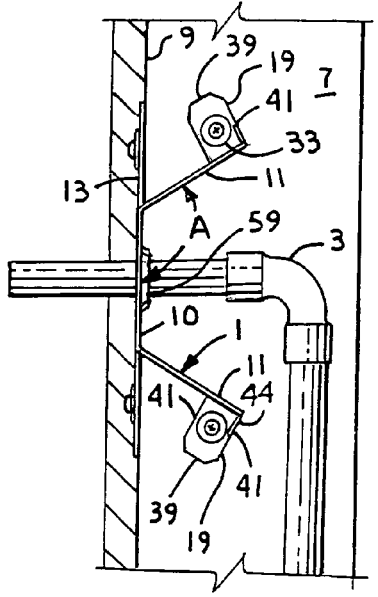
FIG. 2 is an end view of the bracket of FIG. 1.

Looking at the bracket 1 of FIGS. 1 and 2 in more detail, the front plate 10 is generally T-shaped with the primary mounting tab 13 extending outwardly in two opposed directions from the arm 15 and lying generally perpendicular to the arm 15. The tab 13 includes an outer edge 21, a pair of shorter inner edges 23 and a pair of opposed ends 25. The arm 15 includes opposed side edges 27 and an outer end 29. The tab 13 is preferably approximately one and one half inches in width from the outer edge 21 to the inner edges 23, which corresponds to the width of the edge 16 of a standard wall stud 7a. The tab 13 further includes one or more fastener receiving holes 30 (two shown in FIG. 3) which are each sized to receive a respective fastener 33 (see FIG. 1), such as a nail or screw, for connecting the front plate 10 to the building member 7.

The side plates 11 are connected to the arm 15 along opposite side edges 27 thereof and angle rearwardly therefrom. The side plates 11 are each in the shape of a right triangle and include a base edge 35 and a back edge 37 which tapers inwardly from the base edge 35 toward the outer end 29 of the arm 15. The included angle A between the arm 15 and each side plate 11 (see FIG. 2) is an obtuse angle, which is preferably about one hundred and twenty degrees.

The secondary mounting tabs 19 are each connected to a respective side plate 11 along the base edge 35 thereof and proximate to the back edge 37 thereof. The tabs 19 extend perpendicularly outward from the respective side plates 11. Referring to FIG. 3, each tab 19 has an end 39, opposed side edges 41, and includes a fastener receiving opening 43 for receiving a respective fastener 33. The openings 43 are preferably in the form of elongate slots. A gusset 44 (see FIG. 1) may be formed along the back edge 37 each side plate 11 at the juncture with the respective secondary mounting tab 19 to add additional strength to the bracket 1.

As shown in FIG. 3, the bracket 1 may be formed from a blank 45 which is a sheet of steel (or other suitable material) initially having the shape of an isosceles triangle with the points or corners removed. A pair of L-shaped cuts 47 are made in the blank 45. Each cut 47 includes a first leg 49 which extends inwardly from a base edge 51 of the blank 45 and separates an end 25 of the primary mounting tab 13 from an edge 41 of a respective one of the secondary mounting tabs 19. Each cut 47 also includes a second leg 53 which separates an inner edge 23 of the primary mounting tab 13 from the base edge 35 of the respective side plate 11. The side plates 11 are then bent rearwardly along dashed lines 55 and the secondary mounting tabs are bent outwardly along dashed lines 57.

Referring again to FIGS. 1 and 2, the pipe receiving openings 17 (four shown) are each sized to receive a respective pipe 3. In this embodiment, each opening 17 is adapted to receive a respective copper pipe 3 and is encircled by a respective rearwardly extending annular flange 59 (best seen in FIG. 2) which allows one or more copper pipes 3 passing through respective openings 17 to be easily soldered to the bracket 1. The bracket 1 is preferably copper plated to promote the solder connection. The flanges 59 extend rearwardly from the arm 15 in order not to interfere with the installation of the wallboard 9. The pipe receiving openings 17 may be of varying sizes for receiving different sized pipe 3, for example the bracket 1 is shown as having three openings 17a sized to receive ½ inch CTS (Copper Tube Size) pipe and one opening 17b sized to receive ¾ inch CTS pipe. The flanges 59 are each sized to receive the respective pipe 3 in closely spaced relation to facilitate soldering of the pipe 3 to the bracket 1.

Figure 4:
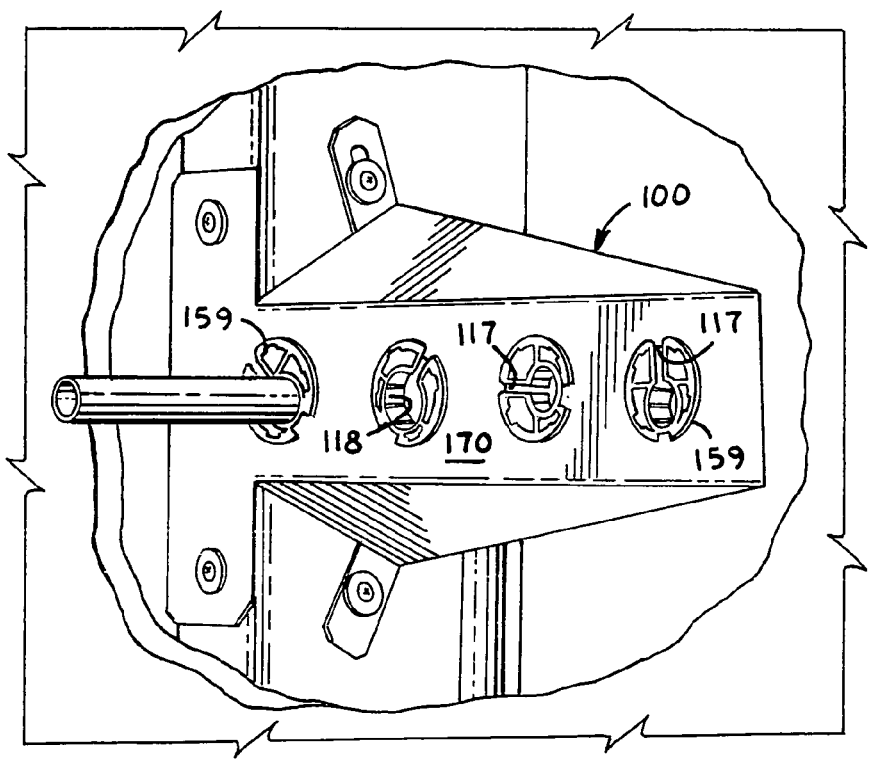
FIG. 4 is a view similar to FIG. 1 showing a first alternative embodiment of the cantilevered pipe support bracket.

Referring to FIG. 4, a first alternative embodiment of the cantilevered plumbing support bracket is designated as bracket 100. The bracket 100 is generally identical to the bracket 1 except that it includes an arm 170 with pipe receiving apertures 117 (four shown) sized to receive a plastic insulator 159, such as the Pipe Eye™ metal stud insulator manufactured by Sioux Chief Mfg. Co., Inc. of Peculiar Mo. The apertures 117 are each preferably one and eleven thirty-seconds of an inch in diameter to receive the respective insulator 117. The insulators 117 have inner pipe receivers 118 sized to receive a pipe 3 and are available in sizes to receive ½ inch CTS, ¾ inch CTS or 1 inch CTS pipe. Because the pipe or pipes 3 are not soldered to the bracket 100, it need not be copper plated and can be galvanized instead.

Figure 6:
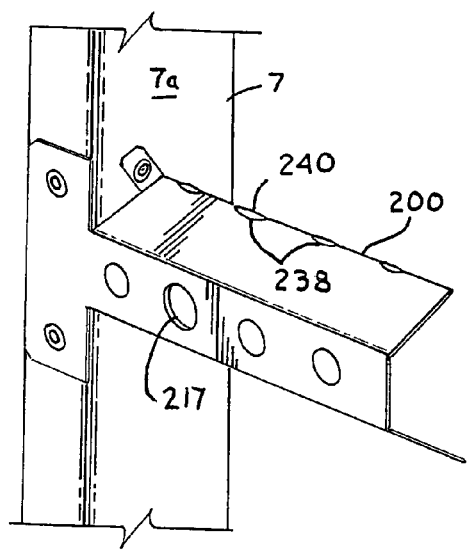
FIG. 6 is a perspective view showing the bracket of FIG. 4 mounted on a wall stud.
Figure 5:
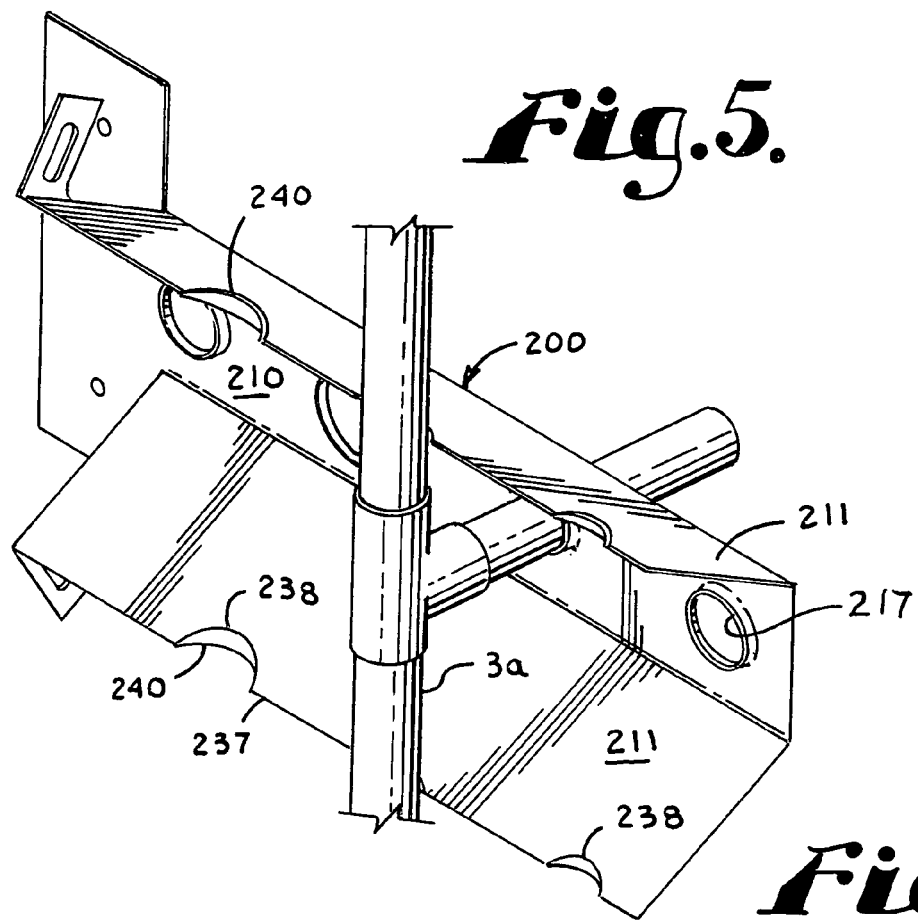
FIG. 5 is a perspective view of a second alternative embodiment of the cantilevered pipe support bracket.

Referring to FIGS. 5 and 6, a second alternative embodiment of the cantilevered plumbing support bracket is designated as bracket 200. The bracket 200 is generally identical to the bracket 1 except that it includes side plates 211 which are rectangular in shape and include a rear edge 237 having notches 238 formed therein for receiving pipes 3a which run parallel to the front plate 210. The notches 238 preferably include arcuate flanges 240 shaped and positioned to be concentric with a pipe 3a which allow the pipe 3a to be readily soldered to the bracket 200. The notches 238 are preferably aligned with pipe receiving openings 217 formed through the front plate 210 and are each sized to receive a pipe 3a which is the same size as the pipe 3 which may be received through the respective opening 217. The openings 217 are identical to the openings 17 described above in relation to the bracket 1. As with the bracket 1, the bracket 200 is preferably copper plated to facilitate soldering of the pipes 3 and/or 3a to the bracket 200.

It is to be understood that while certain forms of the present invention have been illustrated and described herein, it is not to be limited to the specific forms or arrangement of parts described and shown. For example, while the bracket 1 is described herein as being formed of sheet metal, it is to be understood that it could be formed from other materials, such as injection molded CPVC (Chlorinated Polyvinyl Chloride) such that CPVC plumbing pipe 3 could be solvent welded to the bracket 1 using the appropriate cement.

What is claimed and desired to be secured by Letters Patent is as follows:

1. A cantilevered pipe support bracket for supporting a plumbing pipe in spaced relation to a building member, said bracket comprising:
    a) a front plate including a primary mounting tab and an arm extending outwardly therefrom, said arm having a distal end, opposed edges, and at least one pipe receiving opening formed therethrough, said at least one pipe receiving opening being sized to receive a plumbing pipe therethrough; and
    b) a pair of side plates connected to said opposed edges of said arm, said side plates extending rearwardly from said arm and each including a base end proximate said primary mounting tab, each said base end having a secondary mounting tab formed thereon; wherein
    c) said side plates extend rearwardly from said front plate at an obtuse included angle.

2. The cantilevered pipe support bracket as in claim 1 wherein said front plate is generally T-shaped such that said primary mounting tab extends outwardly from said arm in opposed directions.

3. The cantilevered pipe support bracket as in claim 1 wherein said obtuse angle is approximately 120 degrees.

4. The cantilevered pipe support bracket as in claim 1 wherein said side plates are each generally in the shape of a right triangle and taper inwardly from said base end thereof toward said distal end of said arm.

5. The cantilevered pipe support bracket as in claim 1 wherein said side plates are each generally rectangular in shape.

6. The cantilevered pipe support bracket as in claim 5 wherein said side plates each include a rearward edge and each said rearward edge includes at least one pipe receiving notch sized to accept a pipe running parallel to said front plate.

7. The cantilevered pipe support bracket as in claim 6 wherein each said notch is sized to receive a standard sized copper plumbing pipe and includes an arcuate flange shaped and positioned to be concentric with a standard sized copper plumbing pipe running parallel to said front plate.

8. The cantilevered pipe support bracket as in claim 7 wherein said bracket is formed of copper plated steel.

9. The cantilevered pipe support bracket as in claim 1 wherein said at least one pipe receiving opening is sized to receive a standard sized copper plumbing pipe and is encircled by a rearwardly extending annular flange.

10. The cantilevered pipe support bracket as in claim 9 wherein said bracket is formed of copper plated steel.

11. The cantilevered pipe support bracket as in claim 1 wherein there are a plurality of said pipe receiving openings spaced along said arm.

12. The cantilevered pipe support bracket as in claim 11 wherein said pipe receiving openings vary in diameter.

13. The cantilevered pipe support bracket as in claim 1 wherein said at least one pipe receiving opening is sized to receive a plastic insulator which, in turn, includes an inner pipe receiver sized to receive a pipe.

14. The cantilevered pipe support bracket as in claim 13 wherein said bracket is formed of galvanized steel.

15. A cantilevered pipe support bracket for supporting a standard sized plumbing pipe in spaced relation to a building member, said bracket comprising:
   a) a front plate including a primary mounting tab and an arm extending outwardly therefrom, said primary mounting tab being wider than said arm such that said primary mounting tab extends outwardly from said arm in opposed directions, said arm having a distal end, opposed edges, and at least one pipe receiving opening formed therethrough; and
   b) a pair of side plates connected to said opposed edges of said arm, said side plates extending rearwardly from said arm at an obtuse included angle and each including a base end proximate said primary mounting tab and a rearward edge tapering inwardly from said base end toward said distal end of said arm, each said base end having a secondary mounting tab formed thereon.

16. The cantilevered pipe support bracket as in claim 15 wherein said obtuse angle is approximately 120 degrees.

17. The cantilevered pipe support bracket as in claim 15 wherein said at least one pipe receiving opening is sized to receive a standard sized copper pipe and is encircled by a rearwardly extending annular flange.

18. The cantilevered pipe support bracket as in claim 17 wherein said bracket is formed of copper plated steel.

19. The cantilevered pipe support bracket as in claim 15 wherein there are a plurality of said pipe receiving openings spaced along said arm.

20. The cantilevered pipe support bracket as in claim 19 wherein said pipe receiving openings vary in diameter.

21. The cantilevered pipe support bracket as in claim 15 wherein said at least one pipe receiving opening is sized to receive a plastic insulator which, in turn, includes an inner pipe receive sized to receive a pipe.

22. The cantilevered pipe support bracket as in claim 21 wherein said bracket is formed of galvanized steel.

23. A cantilevered pipe support bracket for supporting a standard sized copper plumbing pipe in spaced relation to a building member, said bracket comprising:
   a) a front plate including a primary mounting tab and an arm extending outwardly therefrom, said primary mounting tab being wider than said arm such that said primary mounting tab extends outwardly from said arm in opposed directions, said arm having a distal end, opposed edges, and a plurality of pipe receiving openings formed therethrough and spaced therealong, each said pipe receiving opening being sized to receive a respective standard sized copper pipe and encircled by a rearwardly extending annular flange; and
   b) a pair of side plates connected to said opposed edges of said arm, said side plates extending rearwardly from said arm at an obtuse included angle and each including a base end proximate said primary mounting tab and a rearward edge tapering inwardly from said base end toward said distal end of said arm, each said base end having a secondary mounting tab formed thereon.

24. The cantilevered pipe support bracket as in claim 23 wherein said bracket is formed of copper plated steel.

25. The cantilevered pipe support bracket as in claim 23 wherein said pipe receiving openings vary in diameter.

* * * * *